United States Patent Office 3,795,570
Patented Mar. 5, 1974

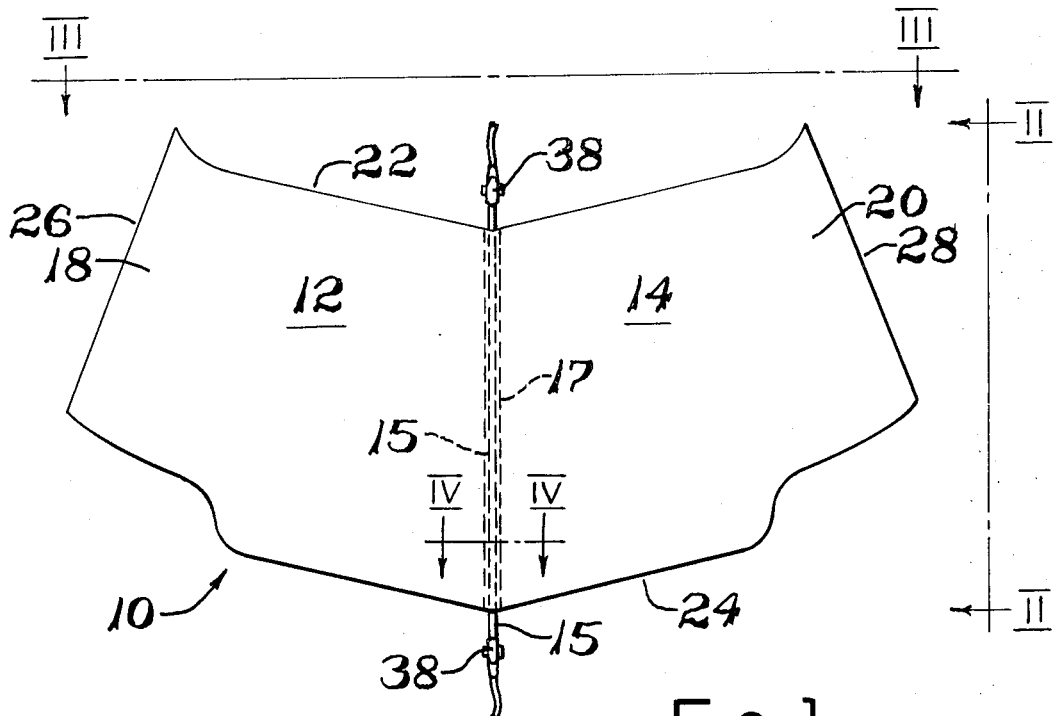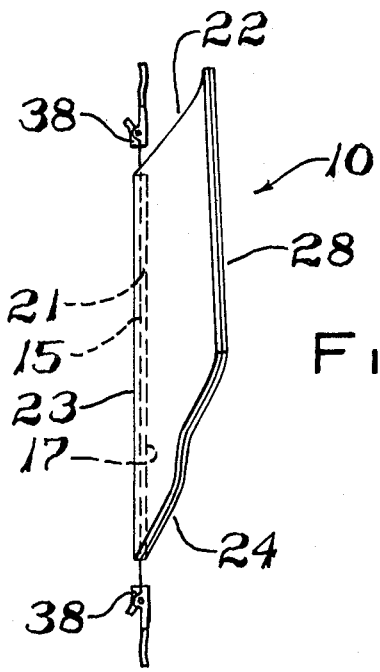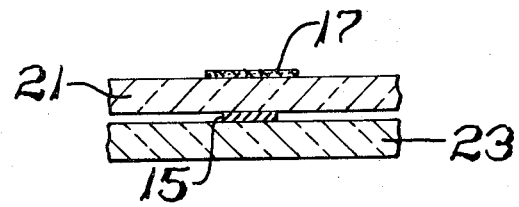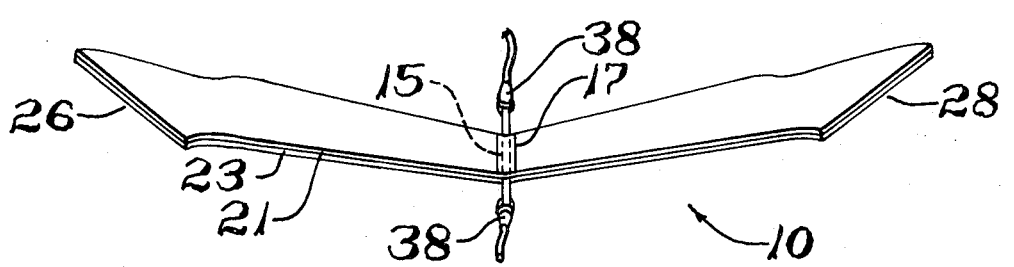

3,795,570
METHOD OF SHAPING GLASS SHEETS TO SHARP BENDS AND SHAPED GLASS SHEETS PRODUCED THEREBY
Robert A. Jansson, Pittsburgh, and Dean L. Thomas, Glenshaw, Pa., assignors to PPG Industries, Inc., Pittsburgh, Pa.
Filed Mar. 29, 1972, Ser. No. 239,031
Int. Cl. B32b 3/30; C03b 23/02; C03c 27/00
U.S. Cl. 161—125
15 Claims

ABSTRACT OF THE DISCLOSURE

Simultaneously bending a pair of glass sheets having a sharply bent portion extending across a portion of the sheet, using a combination of general overall heating with additional resistance heating in said sharply bent portion in such a manner that breakage is avoided and the pair of glass sheets bent simultaneously do not fuse together and can be separated after they are shaped, then assembled with a layer of plastic interlayer material therebetween and laminated.

BACKGROUND OF THE INVENTION

This invention relates to fabricating shaped windows, preferably of the type suitable for use as automobile windows. The present invention has been specifically utilized in connection with making V-shaped laminated windshields in which a sharply bent portion of the installed windshield or backlight extends transversely of an elongated window from one longitudinal side edge thereof to its other longitudinal side edge. The V-shaped window is symmetrical about its sharply bent portion. The present invention is also suitable for use in a compound windshield or backlight or sidelight in which one region of the window is sharply bent into the roof of the vehicle in a substantially horizontal plane from another portion that extends across the front, side, or rear of the vehicle. In addition, the present invention is also suitable for use in fabricating rear-quarter windows for station wagons having a main portion extending forward of the vehicle from a sharply bent corner and a rear portion extending along the rear of the vehicle from the sharply bent corner.

In addition to automotive glass, the present invention is also suitable for use in bay windows for buildings which include a flat central portion spaced outward from the frame of the building and angularly disposed flat glass end portions extending inward from each end of the central portion. Other glass shapes having sharply bent portions are also made possible by the present invention.

Various techniques have been developed to produce a windshield having a sharply bent region. Various patents such as U.S. Pats. Nos. 2,111,392 to Henry J. Galey; 2,176,999 to Robert A. Miller; 2,215,228 to James G. Oliver; and 3,248,195 to James S. Golightly and Harold E. McKelvey suggest various methods and apparatus employing electrical heaters for imparting a relatively sharp bend to a glass sheet. Furthermore, U.S. Pat. No. 2,871,623 to Herman R. Marini and U.S. Pat. No. 3,260,584 to Alfred E. Badger suggest using a heat absorbing material which reradiates heat into a portion to be relatively sharply bent compared to other portions. The heat absorbing material is removed after the glass is shaped. Furthermore, it is also well known to bond electroconductive material onto a surface of a glass sheet in the form of an electrical resistance heating circuit. U.S. Pats. Nos. 2,557,983 to Cyril S. Linder; 2,569,773 to Leighton E. Orr; 2,648,752 to Arnold E. Saunders; 2,648,754 to William O. Lytle; 2,710,900 to Cyril S. Linder; 2,877,329 to Romey A. Gaiser; 2,993,815 to A. W. Treptow; 3,287,684 to Albert Armbruster; 3,302,002 to Robert A. Warren; 3,467,818 to John D. Ballentine; and 3,484,583 and 3,484,584 to Hugh E. Shaw provide examples of electroconductive heating circuits bonded to a surface of a ceramic or glass sheet. To the best of our knowledge, the electroconductive elements of electrical heating circuits of this latter type have been used to heat the glass sheets to which they were bonded sufficiently to remove fog or ice, but insufficient to shape the glass.

It has even been suggested in the prior art to groove the glass in the region of sharp bending. U.S. Pats. Nos. 3,241,936 and 3,281,227 to Herbert A. Leflet, Jr. depict this technique. Such grooving weakens the glass.

Sharp localized bending has also been accomplished by bonding a heat reflecting coating on a portion of a surface opposite the surface facing a heat source. British Pat. No. 942,132 to George Hubble describes such a method.

A method of localized heating using an electroconductive element bonded to a portion of a glass sheet surface is found in Canadian Pat. No. 867,466 to Friedrich Jochim et al.

It has been found that heating circuits in the past have been interconnected between bus bars disposed along the opposite edges of the glass sheet. In the past, the bus bars have been of greater electroconductivity than that of the heating circuit elements in order to be able to have the voltage supply as great a proportion of energy to the heating elements with minimum loss of electrical energy to each bus bar. Such prior art configurations supplied power at maximum efficiency to the heating elements in the region where heat was desired.

In using a single elongated electroconductive heating strip with its ends contacting electrodes in order to apply electrical energy to heat the glass sheet locally along the line of the elongated strip of electroconductive material in the fabrication of V-shaped windows, considerable breakage was experienced. The present invention provides a method of reducing this breakage to a considerable extent.

SUMMARY OF THE INVENTION

The present invention simultaneously bends a pair of glass sheets to conforming shapes including a sharply bent portion of each sheet as an early step in making a V-shaped windshield using a combination of overall heating of the glass sheet with a novel manner of applying additional heating to the sharply bent portion.

According to the present invention, the additional localized heating is supplied by applying an electric voltage to an electroconductive strip disposed between the sheets in the region of sharp bending to enable the strip to heat both sheets simultaneously and equally from the center of the assembly to minimize glass breakage. If desired, a heat absorbing material, preferably a colored glass frit having a lower melting point than glass so that it can fuse to a glass sheet during the heat treatment needed for bending, is also applied to one or both glass sheets as one or more strips. The electroconductive strip is removable after bending. The heat absorbing strips are slightly wider than the electroconductive strip to hide any distortion that may result from the sharp bend imposed along the line of sharp bending.

The resulting laminated window comprises two glass sheets conforming in shape and outline to one another with a layer of flexible plastic resin such as a polyvinyl acetal resin or a polyurethane resin adhering the glass sheets to one another in aligned relationship. The heat absorbing colored frit strip or strips remain as decorative strips extending across the width.

While the decorative, laminated window described herein may be a V-shaped windshield having a sharply bent portion extending across the width of the glass sheet to form two main portions symmetrically arranged with respect to said sharply bent portion, the present invention is equally adapted for any configuration of glass that incorporates a sharply bent portion extending completely across a glass sheet from one edge to an edge opposite thereto.

The surface or surfaces coated with a strip of heat absorbing material must face away from the flexible electroconductive heating strip that is interposed between the glass sheets along the line of sharp bending. The arrangement prevents the glass sheets from fusing to one another when they are bent as a pair while mounted in stacked, aligned relationship with the flexible, removable, electroconductive heating strip and a conventional parting material disposed therebetween.

When a flexible, removable, electroconductive strip is energized when placed on an outside surface of an aligned pair of glass sheets, considerable breakage occurs, but breakage frequency is reduced when the energized strip is between the sheets. The addition of one or more aligned heat absorbing strips has reduced the frequency of glass breakage even more.

The details of the present invention will be understood better in the light of a description of illustrative preferred embodiments and variations thereof that follows. In the drawings that form part of the description, like reference numbers refer to like structural elements.

BRIEF DESCRIPTION OF THE DRAWINGS

FIG. 1 is a front view of an assembly of elements comprising parts of a V-shaped windshield showing how strips are arranged relative to the glass sheets to provide additional localized heating while shaping the pair of glass sheets according to one embodiment of the present invention;

FIG. 2 is an end elevation of the assembly of FIG. 1, taken along the lines II—II of FIG. 1 with the assembly turned slightly;

FIG. 3 is a top view taken along the lines III—III of FIG. 1 with the assembly turned slightly;

FIG. 4 is a fragmentary, enlarged, sectional view taken along the lines IV—IV of FIG. 1; and FIG. 5 is a view similar to FIG. 4, showing an alternate embodiment of the present invention.

DESCRIPTION OF THE PREFERRED EMBODIMENTS

In the drawings, reference number 10 refers to an assembly of elements comprising parts of a so-called V-shaped windshield having two main portions 12 and 14 sharply bent with respect to one another along a transverse line of sharp bending along which are applied thin elongated heating strips 15 and 17. Strip 15 is of electroconductive material, whereas strip 17 is of heat absorbing material.

The windshield may also comprise a pair of longitudinal end portions 18 and 20 that are bent with respect to their respective main portions 12 and 14. The windshield assembly comprises an upper glass sheet 21 and a lower glass sheet 23 mounted with their marginal edges comprising a top edge 22 and a bottom edge 24 interconnected by end edges 26 and 28 in alignment.

The longitudinally extending strips 15 and 17 are applied along a portion of the flat glass sheets in parallel relation to one another along paths destined to become the sharply bent transverse portion between main portions 12 and 14 of the windshield. Strip 15 is applied to the upper surface of glass sheet 23, then glass sheet 21 is superimposed over glass sheet 23 with the strip 17 of heat absorbing material disposed across the upper surface of glass sheet 21. The strip 15 is composed of electroconductive material and has elongated extension portions extending beyond the opposite side edges of the windshield assembly for attachment to electrodes 38. The latter are connected to a voltage source (not shown) through a switch (not shown) to control the application of voltage to heating strip 15.

The top edge 22, the bottom edge 24, and the end edges 26 and 28 of the window are constructed and arranged to conform with in a frame of an automobile windshield opening and, in a particular pattern for which the present invention was developed, has a sharp V-bend disposed centrally across the window from top edge 22 to bottom edge 24 such that the angle between main portion 12 and main portion 14 is 163 degrees at the top edge 22 gradually decreasing to 154 degrees at the bottom edge 24. The windshield is 32 inches wide at the sharply bent portion and each float glass sheet is approximately 100 mils thick.

Preferably, the heating strip of electroconductive material 15 is a thin, flexible metal strip having an electroconductivity per unit length of between 0.01 and 0.25 ohms per inch. Particularly good results are obtained with a Nichrome ribbon 3/16 inch wide, .005 inch thick and having a resistance per unit length of 0.58 ohms per foot (or approximately 0.05 ohms per inch), although any conductive metal in strip form that does not tarnish readily and that does not become bonded to the glass or react chemically with the glass at the elevated temperature range needed for bending is acceptable. Heat absorbing frit 17 is a black glass frit.

The glass sheets with the electroconductive heating strip and additional heat absorbing strip applied thereto are mounted on a bending mold of an outline type and the glass supporting mold is subjected to an elevated temperature sufficient to heat the glass sheet to about the strain point of the glass and to begin to soften the glass sheets. When the glass reaches a suitable temperature in the vicinity of its strain point, voltage is applied along the elongated strip 15 to provide more intense localized heating along the glass regions aligned with the thin elongated heating strips. This heating arrangement causes the glass sheets to develop sharp bends extending across the glass sheet regions adjacent the spaced, elongated strips. Preferably, at the same time, the rest of the glass conforms to the shape of an outline mold. However, if the bend is further complicated, as, for example, by the desire for bending the two main portions to complicated shapes, it may be necessary to perform the shaping in more than one stage. Such multiple stage bending, if needed, is well known in the art and forms no part of the present invention.

The electroconductive heating strip is preferably approximately 3/16 inch wide for use with glass sheets approximately 100 mils thick that are presently used in laminated windshields, when the electroconductive element is a metal strip. Metal strips less than 1/8 inch wide distort the glass and tend to fuse the glass portion being bent sharply when sufficient electrical energy is supplied to induce the sharp bending required locally. On the other hand, metal strips wider than 1/4 inch are not suitable for producing the very sharp bends presently required.

Different glass sheet dimensions require different optimum cross-sectional areas for the heating strip to provide sufficient localized resistance heating. The strip must be sufficiently thin to avoid any optical distortion caused by the heating strip penetrating into the heat-softened portion undergoing sharpest bending so that it flexes as the glass forms a "V." In addition, the flexible metal strip must be sufficiently narrow so that the line of sharp bending is as narrow as possible so that it does not become necessary to cover the sharply bent portion with an opaque coating of such a width that it interferes with vision through the window. Presently, automobile designers are prepared to accept opaque coatings that hide any optical distortion or marking in the sharply bent portion of a V-shaped windshield provided the coating has a maximum width not exceeding 3/8 inch, which is wider than strip 17.

In fabricating a laminated window, two aligned glass sheets 21 and 23 with strips 15 and 17 arranged as in FIGS. 1 to 4 are loaded for simultaneous bending as a pair on a bending mold with a parting material to prevent fusion disposed therebetween. Electrodes 38 connected to a source of potential (not shown) are clamped to the extensions of the electroconductive metal strip 15 to provide a heating circuit between the surfaces of glass sheets 21 and 23.

The heat absorbing strip 17 on the upper surface of the upper glass sheet 21 is preferably composed of a mixture of glass frit and a coloring oxide containing 80 to 95 parts by weight of a glass frit having a lower melting point than the glass sheet and a thermal expansion coefficient compatible with that of glass so that it fuses to the glass surface before the glass distorts and does not harm the glass surface when the glass sheet is cooled after its bending, and 20 to 5 parts by weight of a coloring oxide. Both the frit and the colorant are in finely divided particulate form and are dispersed in an oil binder to provide a liquid dispersion having a suitable viscosity for application by the silk screen method described in U.S. Pat. No. 3,638,564 to Bernard H. Prange and Dean W. Gintert.

Preferably, the thin, elongated, heating strip of heat absorbing material 16 is a mixture of finely divided glass frit and coloring oxide having a coefficient of thermal expansion between about 45 to $90 \times 10^{-7}$ inch per linear inch per degree centigrade so that it is compatible with that of present commercial soda-lime-silica float, sheet or plate glass. A typical heat absorbing material suitable for application by the so-called silk screening technique contains 100 parts by weight of a finely divided colored frit mixture and 20 parts by weight of an oil such as one known as "Squeegee" oil. The ceramic frit has a coefficient of thermal expansion of approximately 50 to 55 times $10^{-7}$ per degree centigrade.

If desired, the heating strip 15 of flexible metal may be replaced by a strip of conductive tape, such as carbon tape, on the upper surface of the lower glass sheet 23. The strip of electroconductive tape has extensions at each end. Electrodes 38 are clamped to the extensions.

One good feature of the carbon tape is that it is more flexible and has less density than a flexible metal strip. Therefore, carbon tape is less likely to penetrate into or otherwise mark the glass sheet on which it is applied. However, a flexible metal strip is reusable, whereas a carbon tape may be used only one time.

The two glass sheets with the thin, electroconductive strip disposed therebetween along the region of sharp bending and parting material disposed between their adjacent surfaces are supported in superimposed aligned relation as an assembly on an outline bending mold of the gravity sag type with a strip of heat absorbing material optionally applied to the uppermost surface of the assembly. The parting material is preferably of a type that need not be removed from between the bent sheets, as disclosed and claimed in U.S. Pat. No. 2,725,320 to Florian V. Atkeson and James C. Golightly. The assembly is heated to an elevated temperature.

The outline bending mold may be similar to that disclosed in U.S. Pat. No. 2,999,338 to Ronald E. Richardson except for the difference in shape of the outline shaping surface and the substitution of clamping electrodes for the resistance heaters, which electrodes are clamped as described previously. When the temperature of the glass approximates its strain point, voltage is applied to the electroconductive strip 15 to assist the glass to assume the shape of the supporting mold. When the glass sheets have conformed to the mold shaping surface, the two shaped glass sheets are removed from the mold, separated from one another and laminated with a thermoplastic material therebetween to form a complete windshield. A preferable method of laminating glass to plastic is described in U.S. Pat. No. 2,948,645 to Laurence A. Keim.

Any well known commercial plate, float or sheet glass composition or any other transparent glass generally used in windows is suitable for use in the present invention. Particularly suitable compositions are those of the soda-lime-silica type which may include or exclude a glass tinting composition such as about one-half percent of iron oxide. The glass sheet is preferably between about .05 inch and .13 inch thick.

Preferably, the present invention helps make a window which has at least one ply composed of a commercial soda-lime-silica glass such as glasses having the following composition:

|  | Percent by weight |
|---|---|
| $Na_2O$ | 10–15 |
| $K_2O$ | 0–5 |
| $CaO$ | 5–15 |
| $SiO_2$ | 65–75 |
| $MgO$ | 0–10 |
| $B_2O_3$ | 0–5 |

A typical soda-lime-silica glass suitable for use in accordance with this invention has the following composition:

|  | Percent by weight |
|---|---|
| $SiO$ | 71.38 (usual variation 71 to 74%). |
| $Na_2O$ | 12.76 (usual variation 12 to 14%) |
| $K_2O$ | 0.03 (usual variation 0 to 1%). |
| $CaO$ | 9.67 (usual variation 8 to 12%). |
| $MgO$ | 4.33 (usual variation 2 to 5%). |
| $Na_2SO$ | 0.75 (usual variation 0.1 to 1.0%). |
| $Fe_2O_3$ | 0.15 (usual variation 0.1 to 1.0%). |
| $Al_2O_3$ | 0.81 (usual variation 0.1 to 1.0%). |

The plastic layer of a laminated window is selected from those materials which are flexible, optically transparent and, for bilayer windshields, are somewhat abrasion resistant. Further, the plastic materials, when laminated to a thin ply of glass to form a laminated window, should minimize the dangers of both lacerative and concussive injuries. To fulfill these latter two requirements, the plastic innerlayer material is preferably a polyurethane resin or a polyvinyl acetal resin. Typical suitable polyurethane resins of the thermosetting type are described and claimed in U.S. Pat. No. 3,509,015 to Marco Wismer, Vernon G. Ammons and Miachael E. Dufala, while suitable polyurethane resins of the thermoplastic type are described in U.S. patent application Ser. No. 155,944, filed June 21, 1971, the disclosure of which is incorporated herein by reference. A typical polyvinyl acetal resin is described in U.S. Pat. No. 2,400,957 to Stamatoff. More details on the preparation of polyvinyl acetal resins are found in U.S. Pat. No. 2,496,480 and Reissue Pat. No. 20,430. Various plasticized polyvinyl acetal resins are described in U.S. Pat. No. 2,372,522 and many well-known plasticizers for polyvinyl butyral are found in U.S. Pat. No. 2,526,728 to Burk et al.

The inner plastic ply is of uniform thickness from about 10 to 75 mils thick, but is preferably about 20 to 50 mils in thickness. Inner plastic plies of less than 10 mils in thickness are not recommended because thin plastic sheets of less than 10 mils thickness tear easily upon impact. Tearing decreases penetration resistance of the laminated structure, which presents the danger in a motor vehicle of an occupant being partially or completely ejected in an accident. Inner plastic plies of greater than 75 mils in thickness should not be used because they result in a more rigid laminated structure which increases the danger of concussive injuries upon head impact. Also, thicker plastic plies increase the weight of the resultant laminated structure and reduce light transmittance.

The following compositions can be used as conductive strips: Nichrome ribbon, copper ribbon or braid, metal alloy ribbon, stainless steel tape, carbon tape, and the like.

The following compositions were actually used to bend pairs of glass sheets into V-shaped configurations of windshield approximately 42 inches wide in the sharply bent region. Table I recites the construction of the strips.

TABLE I

Compositions of electroconductive heating strips

| Composition | Resistance per unit length (ohms per linear inch) |
|---|---|
| (A) Nichrome strip 1/8 inch wide, .0056 inch thick | .078 |
| (B) Nichrome strip 3/16 inch wide, .005 inch thick | .048 |
| (C) Nichrome strip 1/4 inch wide, .0063 inch thick | .027 |
| (D) Carbon tape 1/4 inch wide, .005 inch thick | .218 |
| (E) Carbon tape 1/4 inch wide, .010 inch thick | .162 |

Examples

The following examples report several experiments to produce V-shaped bends in two glass sheets simultaneously. In each example, a pair of float glass sheets approximately 100 mils thick was mounted on a sectionalized outline bending mold with a parting material of a diatomaceous earth therebetween. An electroconductive heating strip was placed across the upward face surface of the lower sheet. In some cases, an additional strip of frit 5/16 inch wide and 1/2 mil thick was applied over the upward facing surface of the upper glass sheet. Electrodes were connected to the ends of the electroconductive heating strip to form a heating circuit. The strip of heat absorbing frit was arranged parallel to the strip applied between the adjacent glass surfaces and separated from the electroconductive strip by the glass thickness.

The glass-laden mold was introduced into a lehr maintained at a lehr temperature recorded in Table II. A thermocouple attached to the upper glass sheet surface about three to four inches from the heating strip and approximately midway between the side edges of the attached glass sheet recorded the glass temperature. When the recorded temperature reached a value listed as power application temperature, 60 cycle alternating current was applied between the electrodes at a recorded voltage for a period of seconds listed in Table II. The resulting maximum current in amperes and peak power in watts for each run is also tabulated in Table II. After bending was completed, the bent sheets were annealed by controlled cooling.

The results reported in Table II also show that even in the absence of one or more heat-absorbing strips, it is possible to bend glass sheets in pairs successfully when the electroconductive strip heater is disposed between the glass sheets. Earlier trials using electroconductive heating strips disposed along the upper surface of the upper glass sheet of a pair of glass sheets undergoing simultaneous bending resulted in considerable glass sheet breakage. When the electroconductive strip heater is inserted between the aligned glass sheets along a region to be bent sharply, heating efficiency improves. The potential difference applied across the electroconductive strip causes the resulting resistance heating to heat both of said aligned glass sheets simultaneously along the elongated region of sharp bending more efficiently because the elongated flat resistance heating strip simultaneously engages the interfacial surfaces of the glass sheets. This contact with both glass sheets causes the electrically heated strip to impart heat more efficiently to the glass sheet assembly by a combination of radiation and conduction in both directions from the center of the thickness of the assembly toward the outer surfaces of the assembly than when the strip heater is located on an outer surface of the assembly.

A pleasant surprise discovered from this work is that a high voltage is not needed to impart a sharp bend to one or more glass sheets. In the past, thousands of volts have been applied along strips of electroconductive material applied to a glass surface to shape the glass. These experiments demonstrate that electric heat needed for V-shaped bends in glass can be obtained from ordinary line current from 110 volts A.C. or 220 volts A.C. using a step-down transformer. The lower voltage applications are safer for operating personnel to handle and reduce the load required of a local power system.

Also, in order to minimize glass breakage, it is recommended that the voltage be applied initially at a low value. The voltage can then be increased to a maximum value not exceeding line voltage, either by a gradual increase or by a stepwise increase.

While the present invention has been described previously in terms of fabricating bent laminated windows comprising two sheets of glass, it is understood that, after a pair of glass sheets has been shaped simultaneously as described hereinabove, it is possible to laminate each of

TABLE II.—DETAILS OF BENDING TRIALS

| Composition of strip | Initial lehr temperature (° F.) | Power application temperature (° F.) | Time power applied (seconds) | 60 cycle A.C., volts | Maximum current (amperes) | Peak power (watts) |
|---|---|---|---|---|---|---|
| Ay (W/O) | 800 | 985 | 805 | 64.5 | 15 | 968 |
| A (W/O) | 800 | 985 | 675 | 53 | 12.5 | 663 |
| Ay (W/O) | 800 | 985 | 710 | 55¼ | 12.5 | 691 |
| B (W) | X | X | 871 | 49.7 | 20 | 994 |
| C (W/O) | 800 | 960 | 895 | 36 | 20 | 720 |
| D (W/O) | 800 | 960 | 600 | 31¼ | 10 | 313 |
| D (W/O) | 800 | 960 | 765 | 34 | 10 | 340 |
| E (W/O) | 800 | 930 | 480 | X | 13 | X |
| E (W/O) | 800 | 960 | 765 | 34 | 10 | 340 |
| E (W) | X | X | 675 | 52.2 | 13 | 679 |
| E (W/O) | 800 | 960 | 755 | 32.5 | 14.5 | 471 |

NOTES: W=With heat absorbing strip; W/O=Without heat absorbing strip; X=Not available; Y=The upper sheet broke.

Increasing the power input generally decreases the time required to produce a sharp bend. However, care must be taken to limit the power input to avoid setting up a thermal gradient through the glass thickness that could cause breakage or soften the glass sufficiently to fuse the heater to the glass. Furthermore, using a strip heater in combination with one or more heat absorbing strips lessens the chance of glass breakage. In addition, when the electric power supplied does not exceed 50 watts per inch of length of said sharply bent portion, less breakage occurs.

It is understood that a strip 17 of heat absorbing frit may be applied to the upper surface of the upper glass sheet 21 in combination with a second strip 27 of heat absorbing frit applied to the lower surface of glass sheet 23. Such a configuration is shown in FIG. 5.

the glass sheets so shaped to a layer of plastic resin to form a so-called bilayer window. When such a window is installed, the glass sheet faces outward and the plastic sheet faces inward of the installation in which the bilayer window is installed.

The form of the invention shown and described in this disclosure represents an illustrative preferred embodiment and certain modifications thereof. It is understood that various changes may be made without departing from the gist of the invention as defined in the claimed subject matter that follows.

We claim:

1. In the method of simultaneously bending a pair of glass sheets to a shape including an elongated sharply bent region extending from edge to edge of said sheets using a combination of general heating supplemented by additional localized heating of said region applied to said pair of glass sheets while said pair is mounted in alignment in bending relation to a mold, the improvement comprising disposing a strip of electroconductive material only between said regions of said sheets to be bent sharply, applying a potential difference across said electroconductive strip to heat said strip by resistance heating while said strip is simultaneously engaging the interfacial surfaces of said glass sheets to enable said heated strip to impart additional heat provided by said resistance heating simultaneously to both of said pair of glass sheets along said elongated region of sharp bending, and bending said pair of glass sheets along the heated regions thereof.

2. In the method as in claim 1, the improvement wherein said potential difference is applied at gradually increasing magnitude.

3. In the method as in claim 1, the improvement wherein said potential difference does not exceed 220 volts.

4. In the method as in claim 1, the improvement further comprising applying a strip of heat absorbing material to at least one of said glass sheets along a surface of said glass sheet opposite one of said interfacial surfaces along a path parallel to said strip of electroconductive material before said heating is applied, whereby at least a portion of said heat from said resistance heating is absorbed by said heat absorbing material and reradiated therefrom into said one of said glass sheets along said elongated region of sharp bending.

5. In the method as in claim 4, the improvement wherein said strip of heat absorbing material is applied to the upper surface of the upper glass sheet of said mounted pair of sheets.

6. In the method as in claim 4, the improvement wherein a strip of heat absorbing material is appiled to a surface of each of said glass sheets and said glass sheets are mounted with said electroconductive strip between said sheets and said strips of heat absorbing material on said glass sheet surfaces facing away from said interfacial surfaces.

7. In the method as in claim 4, wherein said heat absorbing material is a colored frit that has a lower melting point than that of said glass sheets, whereby said strip of frit fuses onto the surface of a glass sheet to which said frit is applied during said heating.

8. In the method as in claim 7, wherein said strip of colored frit applied along said path is slightly wider than said electroconductive strip and has both longitudinal edges disposed outside the planes through the thickness of the assembly that passes through the corresponding longitudinal edges of said electroconductive strip.

9. In the method as in claim 4, wherein said glass sheets are separated from one another after said pair is bent to said shape, said electroconductive strip is removed from between said interfacial surfaces, and said pair of glass sheets is assembled with a layer of plastic resin therebetween and the resulting assembly is laminated.

10. In the method as in claim 6, wherein said glass sheets are separated from one another after said pair is bent to said shape, said electroconductive strip is removed from between said interfacial surfaces and each of said pair of glass sheets is laminated to a separate layer of plastic resin.

11. A window comprising a glass sheet having a sharply bent portion extending across a portion of the sheet from edge to edge of said sheet, a strip comprising a fused colored glass frit bonded to, overlying and extending slightly beyond said sharply bent portion and approximately coextensive therewith for concealing distorted portions of said bent portion, and a layer of plastic resin bonded to said glass sheet.

12. A window as in claim 11, including a second glass sheet bonded to said layer of plastic resin and spaced from said first glass sheet by a distance approximating the thickness of said layer of plastic resin.

13. A window as in claim 12, wherein said strip of a fused colored glass frit is bonded to a surface of one of said glass sheets that faces away from its surface bonded to said layer of plastic resin.

14. A window as in claim 13, wherein said plastic resin is a polyvinyl acetal.

15. A window as in claim 13, wherein said plastic resin is a polyurethane resin.

References Cited
UNITED STATES PATENTS

| | | | |
|---|---|---|---|
| 2,871,623 | 2/1959 | Marini | 65—107 X |
| 2,527,720 | 10/1950 | Guyer | 65—40 |
| 3,551,281 | 12/1970 | Takaura et al. | 161—199 |
| 3,391,053 | 7/1968 | Kolb | 161—185 |

ARTHUR D. KELLOGG, Primary Examiner

U.S. Cl. X.R.

65—100; 161—145, 194, 203